United States Patent [19]
Arner

[11] Patent Number: 5,873,227
[45] Date of Patent: Feb. 23, 1999

[54] COMBINE HARVESTER ROTOR SPEED CONTROL AND CONTROL METHOD

[75] Inventor: Robert J. Arner, Lee's Summit, Mo.

[73] Assignee: Agco Corporation, Independence, Mo.

[21] Appl. No.: 964,435

[22] Filed: Nov. 4, 1997

[51] Int. Cl.⁶ .................................................. A01D 41/00
[52] U.S. Cl. ........................................ 56/14.6; 56/10.2 G
[58] Field of Search .............................. 56/10.2 G, 14.6, 56/DIG. 15; 460/1, 4, 6, 7; 364/424.07

[56] References Cited

U.S. PATENT DOCUMENTS

| | | | |
|---|---|---|---|
| 4,337,611 | 7/1982 | Mailander et al. | 56/10.2 |
| 4,348,855 | 9/1982 | DePauw et al. | 56/10.2 X |
| 4,466,231 | 8/1984 | Rowland-Hill et al. | 56/DIG. 15 X |
| 4,893,241 | 1/1990 | Girodat et al. | 56/10.2 G X |
| 5,666,793 | 9/1997 | Bottinger | 56/DIG. 15 X |

OTHER PUBLICATIONS

Eaton Hydraulics Division, "Installation & Operating Instructions, Eaton Heavy Duty Hydrostatic Transmissions, Electronic Transit Mixer Control" Copyright 1992 Eaton Corporation.

"Massey 8560" Massey Combines Corporation (no date).
"Massey 8560 Rotary Combine" Massey Ferguson (no date).

*Primary Examiner*—Thomas B. Will
*Assistant Examiner*—Robert Pezzuto
*Attorney, Agent, or Firm*—Reising, Ethington, Learman & McCulloch

[57] ABSTRACT

The combine harvester has a threshing and separating rotor with a threshing cylinder section that cooperates with a concave to thresh crop material. A hydraulic motor drives the rotor. A hydraulic pump, driven by an internal combustion engine, supplies hydraulic fluid to the hydraulic motor to drive the rotor. An electronic controller receives a rotor speed measurement from a speed sensor and compares the rotor speed with a selected threshing and separating rotor speed selected by an operator of the harvester and stored in the electronic controller. When the rotor speed varies from the selected rotor speed, the electronic controller sends a signal to a displacement control to change the threshing and separating rotor speed to approach the selected rotor speed. The displacement control can reverse the flow of hydraulic fluid to the hydraulic motor to reverse the direction of rotor rotation.

15 Claims, 3 Drawing Sheets

COMBINE HARVESTER ROTOR SPEED CONTROL AND CONTROL METHOD

TECHNICAL FIELD

This invention is in a threshing rotor or cylinder speed control system and more particularly in a system for controlling a rotor speed of an axial flow combine harvester with a hydraulic rotor drive.

BACKGROUND OF THE INVENTION

Combine harvesters thresh grain by passing crop material between a rotating rotor or cylinder and a stationary concave of a threshing assembly. The operator of a combine harvester can control the efficiency of the crop threshing assembly by changing the gap between the rotating rotor and the concave, changing the rotational speed of the rotor and by changing the quantity of crop material passing through the rotor and concave.

The operator controls the feed rate of crop material passing through the rotor and concave by controlling the ground speed of the harvester. Normally the operator attempts to adjust the ground speed to hold the feed rate at a level which will maximize harvester capacity without overloading harvester components.

Rotor speed and the gap between the rotor and the concave are two adjustments that are available to the operator to ensure that all the grain is threshed from the heads, that the quantity of grain that is cracked or otherwise damaged is minimized and that the quantity of material other than grain to be separated by the sieve and chaffer is minimized. These adjustments can be made from the operator's cab on some combine harvesters.

Adjusting the gap between the rotor or cylinder and the concave and the rotor or cylinder speed is to some extent an art, especially in unusual and difficult threshing conditions. Adjusting the gap between the concave and the rotor is a mechanical adjustment and generally remains fixed once it is made.

Adjusting rotor speed is a more difficult matter in that there are a number of factors that can change rotor speed. The internal combustion engine, that drives the rotor, rotates at an operating speed controlled by a governor. Governors are generally mechanical devices that react to changes in engine speed. Well designed and manufactured governors allow some variation in engine speed. This variation in engine speed results in rotor speed variations.

Threshing cylinders and rotors have been driven by chain drives and belt drives. The output of chain drives can be changed by changing sprockets. Changing sprockets in the field is time consuming and is not something that is undertaken frequently. Belt drives have employed variable speed drive sheaves that are adjusted from the operator's station. Belt drives in high torque applications have a limited operating life and high maintenance costs. For that reason it is desirable to drive the rotors of combines with axial crop material flow with hydraulic pumps and motors. It would also be desirable to employ a hydraulic pump and motor to drive a cylinder with tangential flow in a high capacity harvester. Hydraulic pumps and motors can be designed to deliver high torques and their output speed is easily adjusted. Hydraulic pumps and motors have generally not been used to drive rotors due to their cost and because the output speed of a hydraulic motor varies substantially depending upon the output torque and the viscosity of the hydraulic oil. The viscosity of the hydraulic oil varies substantially from cold mornings to high mid-day temperatures. Crops are harvested in some areas where temperature variations of 50° F. or more are common during a 24-hour period. The volumetric efficiency of a new hydraulic pump will vary from 99% at low load and low oil temperatures to 94% at moderate to high loads and high oil temperatures. The hydraulic motor has the same change in volumetric efficiency. The change in the speed of a threshing rotor in an axial flow combine, with a hydraulic pump and motor drive having the volumetric efficiencies set forth above, will approach 14% of the high speed. The change in rotor speed, due to variations in engine speeds, may increase or decrease a change in rotor speed due to changes in the volumetric efficiency of the hydraulic pump and motor that result from load changes and temperature changes. A change in rotor speed of more than about three percent from the ideal speed would normally be considered unacceptable.

SUMMARY OF THE INVENTION

An object of the invention is to provide a combine harvester with an automatic threshing rotor speed control system. Another object of the invention is to provide a combine harvester having an axial flow threshing rotor driven by a hydraulic pump and motor with a constant rotor speed control. A further object of the invention is to provide a combine harvester with a hydraulic pump and motor rotor drive that can be reversed to drive the rotor in a reverse direction and remove blockages when the rotor is plugged by excess crop material.

The combine harvester has an axial flow threshing and separating rotor. A hydraulic pump is driven by an internal combustion engine that provides power for operating the combine harvester. A hydraulic motor is driven by hydraulic fluid from the pump and drives the rotor. A controller monitors the speed of rotation of the rotor and adjusts the position of the rotor pump swash plate to change pump displacement when the, measured rotor speed varies from the speed setting.

The rotor speed setting can be changed by the operator in the operator's cab. The direction of rotation of the rotor motor can also be changed from the operator's cab when necessary to unplug a rotor that has been plugged by excess crop material.

DESCRIPTION OF THE PREFERRED EMBODIMENT

Figure 1:
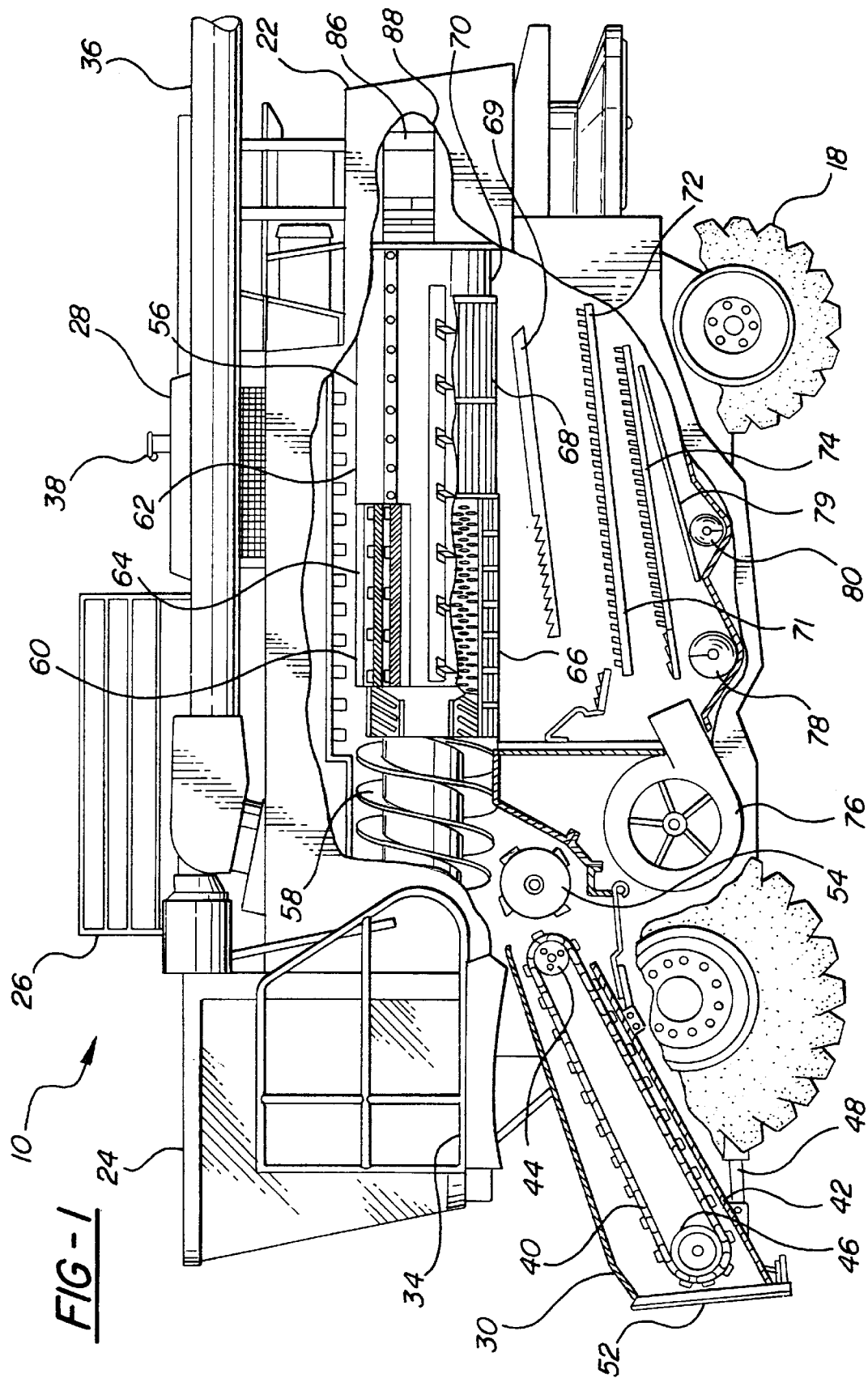
FIG. 1 is a side elevational view of a combine harvester separator with parts broken away.

The combine harvester generally designated by the reference number 10 is self-propelled. The combine frame 12 is supported by two front driven wheels 14 and 16 and rear steered wheels 18 and 20. The wheels 18 and 20 could be driven if desired. The frame 12 could also be supported by a full track system or by half tracks. Half tracks would replace the driven wheels 14 and 16 only.

The combine 10 has a separator housing 22 mounted on the frame 12, an operator's cab 24 mounted on the front portion of the frame, a grain tank 26, an engine compartment 28 and an elevator assembly 30. A ladder 32, and a cab access platform 34 provide operator access and egress to and from the cab 24. A swingable unloading auger assembly 36 pivots to a position extending laterally outward to one side of the combine 10 to unload the grain tank 26. The unloading auger assembly 36 swings inward to a storage position shown in FIGS. 1 and 2 when the grain tank 26 is not being unloaded. The engine compartment 28 houses an internal combustion engine 38 mounted on the frame 12 above the separator housing 22 and to the rear of the grain tank 26.

Figure 2:
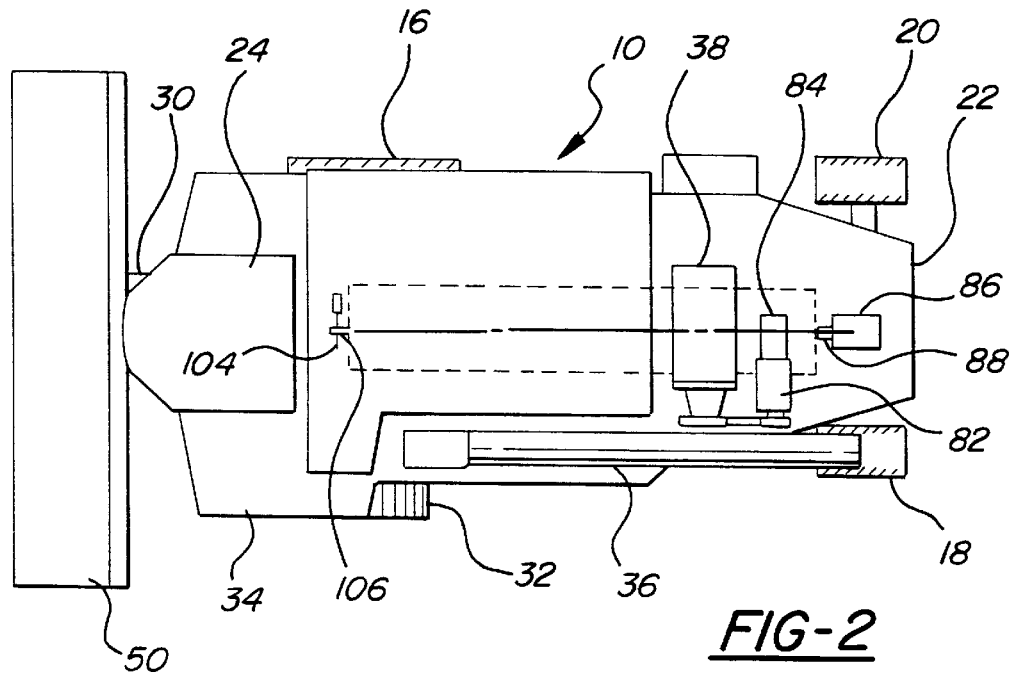
FIG. 2 is a schematic plan view of a combine harvester and harvester drive components.

The elevator assembly 30 has a conveyor 40 mounted in an elevator housing 42. The conveyor 40 as shown in FIG. 1 is trained around rear drive sprockets 44 and a front drum 46. Pivot assemblies not shown pivotally attach the elevator housing 42 to the frame 12 for pivotal movement about the axis of the drive sprockets 44. Hydraulic linear acuators 48 pivot the elevator housing 42 to raise and lower the forward end of the housing. Headers 50 attach to the forward end surface 52 of the elevator housing 42. These headers 50 can be grain headers, which sever crop material from the ground, pick up headers which lift crop material from the ground, corn heads and various other headers designed to harvest specific crops. All of these headers 50 gather crop material and feed the crop material to the conveyor 40. The conveyor 40 conveys crop material through the elevator housing 42 and to the separator housing 22.

Crop material is received by the feed beater 54 in the separator housing from the conveyor 40 in the elevator housing 42. The beater 54 feeds crop material to an axial flow threshing and separating rotor 56. The rotor 56 as shown in FIG. 1 has a feed section 58, a threshing cylinder section 60 and a separator section 62. The feed section 58 moves crop material in a spiral path about the generally horizontal fore and aft axis of rotation of the rotor 56, toward the threshing cylinder section 60 and parallel of the axis of rotation of the rotor. In the threshing cylinder section 60, crop material passes between cylinder bars 64 and a concave 66 where the grain is threshed. Threshed grain, that is not separated by the concave 66, is separated in the separation section 62 and passes through a separation grate 68. Crop material other than grain is discharged from rotor 56 through the rotor discharge 70.

Grain and crop material other than grain that passes through the concave 66 and the separation grate 68 is cleaned by a chaffer 72, a sieve 74 and air from a fan 76. An upper grain pan 69 gathers grain and chaff from the concave 66 and the separation grate 68 and conveys the gathered grain and chaff to the chaffer 72. Chaff is discharged from the rear of the chaffer 72 and falls to the ground. Clean grain falls into the clean grain auger 78 and is conveyed to the clean grain auger by a lower grain pan 79. The clean grain is conveyed to the grain tank 26 by the clean grain auger 78 and an elevator (not shown). Tailings fall into the returns auger 80 and are conveyed to the rotor 56 where they are threshed a second time.

The threshing and separating rotor 56, as described above, is referred to as an axial flow threshing rotor because crop material is moved generally in a direction parallel to the axis of rotation of the rotor. Combine threshing cylinders that receive crop material tangentially and discharged crop material tangentially are also used. In these harvesters the cylinder rotates about an axis that is generally perpendicular to the path of movement of crop material.

The internal combustion engine 38 mounted in the engine compartment 28 drives a rotor pump 82 and a traction drive pump 84. The traction drive pump 84 drives a hydraulic motor (not shown) that drives the driven wheels 14 and 16. The rotor pump 82 drives a rotor hydraulic motor 86. The rotor hydraulic motor 86 drives the threshing and separating rotor 56 through a planetary reduction in a gear box 88.

The speed of the internal combustion engine 38 is controlled by a governor. The operator of the harvester 10 sets the hand throttle at a maximum speed setting. The governor controls the fuel supply to the engine 38 to maintain engine speed within a controlled range. The engine speed 24 varies with load as shown in the graph in FIG. 4. The load is due to crop material passing through the harvester 10 and the power required to move the harvester through the field. The load due to crop material varies due to changes in the quantity of crop material, the moisture content of the crop material, the quantity of grain in the crop material and other factors. All of these factors vary from place to place in a field. The load on the engine 38 from the traction drive varies depending upon the slope of the surface, soil conditions, the amount of grain in the grain tank 26, and other factors.

Figure 4:
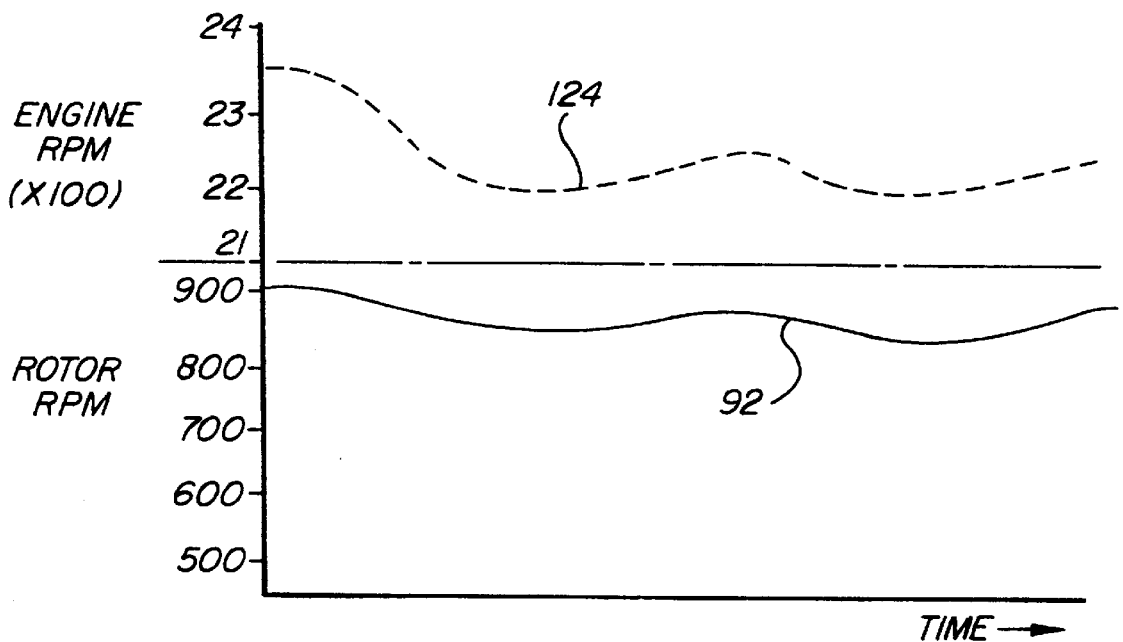
FIG. 4 is a graph of engine speed and threshing cylinder speed without rotor speed control.

The typical example shown in FIG. 4 indicates a no load engine speed of 2350 revolutions per minute (rpm). Under normal load the speed varies between about 2200 and 2250 rpm. The speed would drop below 2200 rpm and continue to decrease if the total horsepower required increases to an amount that exceeds the maximum power available from the engine 38. The engine speed variations of up to 50 rpm, in the example of FIG. 4, results the rotor speed variation 92. As shown in FIG. 4, the rotor speed variation is less than 25 rpm. This is a relatively minor change in rotor speed and would have a minimal effect on operation of the harvester 10 if it were the actual rotor speed variation. Unfortunately it is not the actual change when using a rotor drive that includes a rotor pump 82 and motor 86. The volumetric efficiency of the hydraulic pump depends upon hydraulic pressure and oil viscosity. The pressure increases with load. The viscosity changes with temperature. The volumetric efficiency of a hydraulic pump 82 will vary from 0.99 at low load and low oil temperature to 0.94 at high load and high oil temperature. Harvesters 10 frequently work in areas where ambient temperatures change more than 50° F. from morning to afternoon. The hydraulic motor 86 has a similar drop in volumetric efficiency from early morning to afternoon. Such a change in the volumetric efficiency of the rotor pump 82 and the motor 86 can result in a change in the speed of the rotor 66 that exceeds 110 rpm. That is a significant change in rotor speed and will result in grain loss and may cause grain damage. To accommodate such a change in the speed of the threshing rotor 56, a combine operator has had to make frequent manual adjustments in rotor speed each day. This is a substantial burden on an operator of a combine harvester and takes his time away from other critical tasks. To reduce operator workload and improve harvester efficiency, an automatic speed control 94 has been developed.

Figure 3:
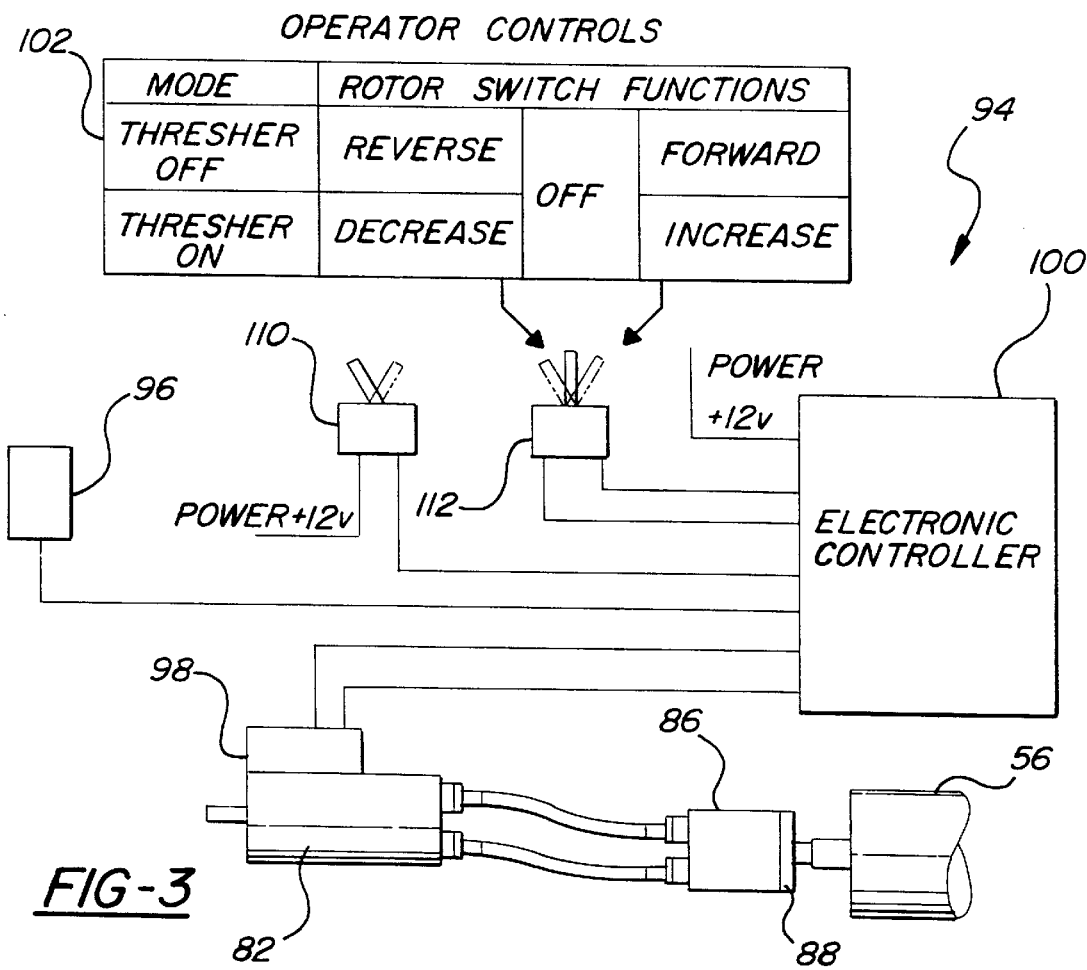
FIG. 3 is a schematic view of a combine harvester threshing rotor speed control.

The automatic rotor speed control 94 is shown in FIG. 3. The rotor speed control 94 schematic includes a rotor speed sensor 96, an electrical displacement control 98, an electronic controller 100 and operator controls 102. The rotor speed sensor 96 includes a toothed wheel 104 on a rotor shaft 106 and a magnetic pick-up 108 that is connected to the electronic controller 100 and transmits actual rotational speed of the rotor 56 to the controller.

The electric displacement control 98 as shown in FIG. 3 is attached to the rotor pump 82. This displacement control 98 includes a solenoid that shifts the position of the swash plate in the axial piston rotor pump 82. The swash plate (not shown) is pivotally mounted in the pump housing and has a limited range of movement. A range of swash plate movement can be further limited by swash plate stops in the pump casing or by electronic stops in the electronic controller 100. The swash plate electric displacement control 98 replaces a mechanical swash plate control used on some axial piston hydraulic pumps.

The rotor motor 86 has a fixed swash plate (not shown). The fixed swash plate in the motor can be replaced by an adjustable swash plate if desired. The rotor drive would then have two swash plates controlling the speed of the rotor motor 86. The speed of the rotor motor 86 could also be controlled by a moveable swash plate in the rotor motor and a fixed swash plate in the rotor pump 82.

The operator controls 102 include a thresher switch 110 and a rotor switch 112. When the thresher switch 110 is "OFF", movement of the rotor switch 112 to the right, as shown in FIG. 3, will energize the controller 100 and drive the rotor in the direction for threshing grain. Movement of the pressure switch 110 to the left will drive the rotor 56 in the reverse direction. Reverse drive of the threshing rotor 56 is explained in more detail below.

Movement of the thresher switch 110 to the "ON" position energized the electric controller 100 and allows the controller to activate the displacement control 98 to bring the rotor speed to the last speed set by the operator. To increase the set rotor speed, the rotor switch 112 is moved to the right as shown in FIG. 3 with the thresher switch 110 "on". To decrease the set rotor speed, the rotor switch 112 is moved to the left. The minimum change, instituted by the rotor switch 112, in the set rotor speed is about fifteen rpm. When the thresher switch is turned "OFF", electronic controller 100 energizes the displacement control 98 to move the swash plate in the rotor pump 82 to neutral and stop the flow of oil to the rotor motor 86.

Electronic controller 100 receives a rotor set speed from the rotor switch 112 of the operator controls 102 when the thresher switch 110 is "ON". The electronic controller 100 also receives actual rotor speed from the rotor speed sensor 96. The actual speed is periodically compared with the rotor set speed and if there is more than a predetermined difference between the actual speed and the set speed, the controller 100 activates the displacement control 98 to move the actual rotor speed toward the set rotor speed. The time period for each comparison by the controller 100 should be a fraction of a second because the load on the engine 38 can change quickly. A variation of less than ten revolutions per minute between the actual rotor speed measured by the rotor speed sensor 96 and the set rotor speed sent to the controller 100 by the rotor switch 112 results in the displacement control 98 being activated to change the actual rotor speed to approach the selected rotor speed. The electronic controller 100 activates the electric displacement control 98 to change the actual rotor speed.

The operating speed of the rotor 56 is adjustable between about 200 rpm and 1000 rpm when the harvester 10 is equipped with a standard gear box 88. With a low speed planetary gear set in the gear box 88, the rotor speed is adjustable between about 175 rpm and 850 rpm. With the low speed gear box, higher torque is available to the rotor for corn, soybeans and other crops that thresh at relatively slow rotor speeds.

The clearance between the rasp cylinder bars 64 and the concave 66 is adjustable. Adjustment can be made by rotating the rotor 56 backwards, raising the concave 66 until a cylinder bar 64 touches the concave and then lowering the concave to provide the desired gap between the cylinder bars and the concave. To ensure there is no damage to the concave 66 or the cylinder bar 64, the reverse speed of rotation of the rotor 56 is about 40 rpm during concave adjustment. This maximum speed of reverse can be obtained by providing a mechanical stop that limits the range of pivotal movement of the swash plate in the rotor pump 82 in the reverse direction. The maximum speed of reverse rotation of the threshing rotor 56 can also be limited by the electronic controller 100.

Threshing and separating rotors 56 occasionally become plugged or blocked by crop material. This crop material is often green or wet and tough. Such blockages can generally be removed by increasing the clearance between the concave 66 and the cylinder bars 64 and driving the rotor in reverse. With difficult blockages it is necessary to rock the rotor 56 back and forth several times. For unplugging operations, high torque is required. Reverse rotor speed could be 100 rpm or so if reverse rotation is not being used for concave as set forth above. When the rotor switch 112 is used to rock the threshing cylinder 56 in the reverse and forward directions, the thresher switch 110 is "OFF" and the crop feed members 40 and 54 are not driven. After the threshing and separating rotor 56 is cleared of crop material, the feed member 40 and 56 can be engaged to completely clean the machine out.

Figure 5:
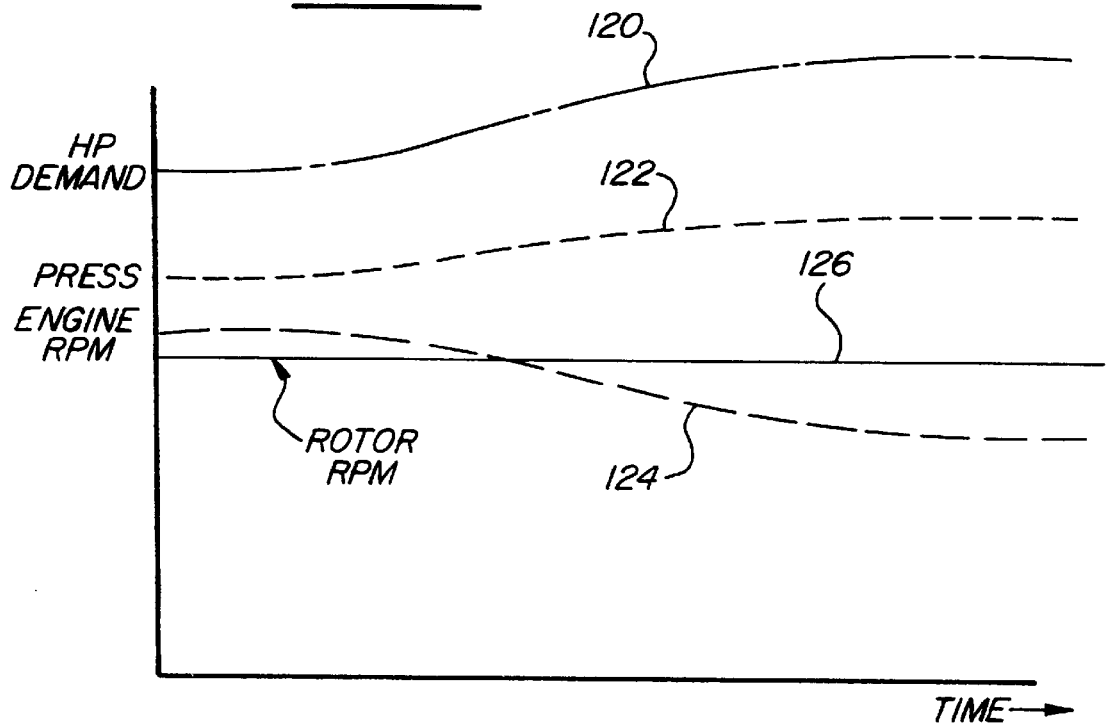
FIG. 5 is a graph showing horsepower increase, hydraulic pump pressure increase and engine speed decrease with rotor speed control.

FIG. 5 shows the relationship between horsepower required 120, pressure increase 122, engine speed 124 and rotor speed 126 with rotor speed control. The horse power required corresponds to the horse power supplied by the engine 38 and assumes that the increase is continuous during the operation of a combine harvester 10. During actual operation of a harvester 10, there are increases and decreases in the power required. However, the graph accurately shows the relationship between the curves for the different horse power levels. The pressure increase 122 is the pressure increase across the hydraulic motor 86. As engine speed 124 decreases due to increases in the load, rotor rpm remains substantially constant. With rotor speed constant, threshing efficiency and grain sample quality also remain relevantly constant. When the demand for engine horsepower 120 exceeds engine capacity, engine speed will drop rapidly. Also, when the hydraulic motor 86 reaches its maximum capacity, further increases in the load on the motor will decrease rotor speed and eventually the rotor speed will drop to zero. A good harvester operator will not normally push the harvester into a condition in which the power required exceeds the capacity of the engine 38.

I claim:

1. A self-propelled combine harvester comprising a frame;
   a crop gathering mechanism mounted on a forward portion of the frame for conveying crop material to a separator housing;
   a threshing assembly including a threshing cylinder rotatably journaled on the frame inside the separator housing and a concave mounted on the frame adjacent to the threshing cylinder;
   an internal combustion engine mounted on the frame for driving the harvester;
   a hydraulic pump driven by the internal combustion engine;
   a hydraulic motor, driven by the hydraulic pump and connected to and driving the threshing cylinder; and
   a hydraulic motor speed control including a threshing cylinder speed sensor that senses the speed of rotation of the threshing cylinder and an electronic controller connected to a cylinder speed selector and the cylinder speed sensor which compares threshing cylinder speed with a selected cylinder speed and adjusts the hydraulic motor speed to maintain the threshing cylinder at the selected cylinder speed.

2. A self-propelled combine harvester as set forth in claim 1 wherein the direction of rotation of the hydraulic motor and the cylinder is reversible.

3. A self-propelled combine harvester as set forth in claim 2 wherein the maximum speed of the cylinder in reverse is about 100 rpm.

4. A self-propelled combine harvester as set forth in claim 2 wherein the hydraulic motor drives the cylinder in reverse at a maximum speed of about 40 rpm.

5. A combine harvester comprising a frame supported and propelled by wheels; a crop gathering mechanism mounted on a forward portion of the frame for conveying crop material to a separator housing; a threshing and separating rotor rotatably journaled on the frame inside the separator housing; a concave mounted on the frame that cooperates with the rotor to thresh grain; a cleaning assembly mounted on the frame inside the separator housing; an internal combustion engine mounted on the frame for driving the harvester; a rotor hydraulic pump mounted on the frame and driven by the internal combustion engine; a hydraulic motor, driven by the rotor hydraulic pump, mounted on the frame and connected to the rotor; a pump displacement control mounted on the rotor hydraulic pump; a rotor speed sensor mounted on the frame that sensing the speed of rotation of the threshing and separating rotor; a rotor speed selector mounted on the frame adjacent to an operator's work station; an electronic controller mounted on the frame and connected to the rotor speed sensor, the rotor speed selector and the electronic pump displacement control and which compares actual rotor speed with selected rotor speed and adjusts the rotor hydraulic pump displacement to maintain actual cylinder speed within a selected rotor speed range.

6. A combine harvester as set forth in claim 5 wherein the rotor hydraulic pump can be shifted by the pump displacement control to a position in which the flow of hydraulic fluid through the hydraulic motor is reversed and the hydraulic motor drives the threshing and separating rotor in reverse to remove blockages.

7. A combine harvester as set forth in claim 6 wherein the concave is adjustably mounted on the frame and the hydraulic motor drives the threshing and separating rotor in reverse at a maximum speed of about 40 rpm during concave adjustment.

8. A combine harvester as set forth in claim 6 wherein the hydraulic motor drives the threshing and separating rotor in reverse at a maximum speed of about 100 rpm.

9. A self-propelled combine harvester comprising a frame; a separator housing mounted on the frame;

a crop gathering mechanism mounted on a forward portion of the frame for conveying crop material to the separator housing;

a threshing and separating rotor rotatably journaled on the frame inside the separator housing;

a concave mounted on the frame that cooperates with the rotor to thresh grain from crop material received from the crop gathering mechanism;

a grain cleaning assembly mounted on the frame for cleaning grain received from the threshing and separating rotor;

an internal combustion engine mounted on the frame for driving the harvester;

a hydraulic pump driven by the internal combustion engine;

a hydraulic motor, driven by the hydraulic pump, and connected to and driving the threshing and separating rotor; and a controller mounted on the frame and having a reverse mode that reverses the direction of rotation of the hydraulic motor and the threshing and separating rotor.

10. A self-propelled combine harvester as set forth in claim 9 wherein the controller receives threshing and separating rotor rotation speed signals from a rotor speed sensor, compares the rotor rotation speed signals with a selected threshing and separating rotor speed and adjusts the hydraulic motor speed as required to drive the threshing and separating rotor at about the selected threshing and separating rotor speed.

11. A self-propelled combine harvester as set forth in claim 10 wherein the selected threshing and separating rotor speed used by the controller is adjustable.

12. A self-propelled combine harvester as set forth in claim 11 wherein the selected threshing and separating rotor speed is adjustable while the threshing and separating rotor is threshing grain from crop material.

13. A self-propelled combine harvester as set forth in claim 9 wherein the controller is connected to a swash plate displacement control on the hydraulic pump and sends signals to the swash plate displacement control to change the direction of rotation and the speed of rotation of the hydraulic motor and the threshing and separating rotor.

14. A self-propelled combine harvester as set forth in claim 13 including a rotor speed sensor which sends a threshing and separating rotor speed signal to the controller, a selector connected to the controller for inserting a selected threshing and separating rotor speed in the controller, a comparator in the controller that compares the threshing and separating rotor speed signal with the selected threshing and separating rotor speed and wherein the controller sends a signal to the swash plate displacement control to move the swash plate when the threshing and separating rotor speed varies more than a predetermined amount from the selected threshing and separating rotor speed.

15. A method of controlling the speed of the threshing cylinder of a combine harvester that is driven by an internal combustion engine, a hydraulic pump and a hydraulic motor comprising;

running the internal combustion engine at a speed controlled by an engine governor;

selecting a desired threshing cylinder speed;

measuring an actual threshing cylinder speed;

comparing the actual threshing cylinder speed with the desired cylinder speed; and adjusting the output speed of the hydraulic motor when there is a significant variation between the actual threshing cylinder speed and the desired threshing cylinder speed.

* * * * *